(12) United States Patent
Matt

(10) Patent No.: US 8,726,729 B2
(45) Date of Patent: May 20, 2014

(54) MEASURING DEVICE

(71) Applicant: KROHNE Messtechnik GmbH, Duisburg (DE)

(72) Inventor: Achim Matt, Duisburg (DE)

(73) Assignee: KROHNE Messtechnik GmbH, Duisburg (DE)

( * ) Notice: Subject to any disclaimer, the term of this patent is extended or adjusted under 35 U.S.C. 154(b) by 0 days.

(21) Appl. No.: 13/692,383

(22) Filed: Dec. 3, 2012

(65) Prior Publication Data

US 2013/0247660 A1    Sep. 26, 2013

(30) Foreign Application Priority Data

Mar. 22, 2012  (DE) .......................... 10 2012 005 638

(51) Int. Cl.
*G01D 11/24* (2006.01)
*G01L 19/14* (2006.01)
*G01P 1/02* (2006.01)

(52) U.S. Cl.
USPC .......................................... 73/431; 73/204.26

(58) Field of Classification Search
USPC .............................................. 73/431, 204.26
See application file for complete search history.

(56) References Cited

U.S. PATENT DOCUMENTS

| | | | |
|---|---|---|---|
| 4,047,242 A * | 9/1977 | Jakob et al. ................... 361/714 |
| 5,071,223 A | 12/1991 | Gotoh et al. | |
| 5,251,096 A * | 10/1993 | Hosoi et al. .................... 361/695 |
| 5,546,804 A * | 8/1996 | Johnson et al. ................. 73/431 |
| 5,777,850 A | 7/1998 | Jakob et al. | |
| 5,954,526 A * | 9/1999 | Smith ........................... 439/136 |
| 6,778,389 B1 | 8/2004 | Glovatsky et al. | |
| 6,896,539 B2 * | 5/2005 | Dobbs et al. .................. 439/376 |
| 7,036,381 B2 * | 5/2006 | Broden et al. .................. 73/708 |
| 7,134,354 B2 * | 11/2006 | Nelson et al. ................. 73/866.3 |
| 7,490,516 B2 * | 2/2009 | Hedtke et al. .................. 73/431 |
| 2009/0173151 A1 * | 7/2009 | Morino et al. ............... 73/202.5 |
| 2010/0046177 A1 | 2/2010 | Rapp et al. | |

FOREIGN PATENT DOCUMENTS

| | | |
|---|---|---|
| DE | 89 09 674 U1 | 11/1989 |
| DE | 101 26 654 A1 | 12/2002 |
| DE | 60 2006 000 146 T2 | 7/2008 |

\* cited by examiner

*Primary Examiner* — Lisa Caputo
*Assistant Examiner* — Jamel Williams
(74) *Attorney, Agent, or Firm* — Roberts Mlotkowski Safran & Cole, P.C.; David S. Safran

(57) ABSTRACT

A measuring device with at least one housing and at least one electronic unit, wherein the housing has at least one electronic access opening for the electronic unit, wherein a first longitudinal axis extends through the electronic access opening, wherein the housing has a sensor access opening for connecting to a sensor unit, wherein a second longitudinal axis extends through the sensor access, wherein the first longitudinal axis and the second longitudinal axis span an orientation plane, wherein the electronic unit has at least one printed circuit board which lies essentially in a printed circuit board plane that, to provide a measuring device, in which the effect of external mechanical stresses on electronic components can be reduced, is arranged in the housing such that the printed circuit board plane is at an angle relative to the orientation plane which differs from an integral multiple of 90°.

5 Claims, 5 Drawing Sheets

MEASURING DEVICE

BACKGROUND OF THE INVENTION

1. Field of the Invention

The invention relates to a measuring device with at least one housing and at least one electronic unit, wherein the housing has at least one electronic access to the electronic unit, wherein a first longitudinal axis extends through the electronic access, wherein the housing has a sensor access for connecting to a sensor unit, wherein a second longitudinal axis extends through the sensor access, wherein the first longitudinal axis and the second longitudinal axis span an orientation plane, wherein the electronic unit has at least one printed circuit board and wherein the printed circuit board lies essentially in a printed circuit board plane.

2. Description of Related Art

In modern process automation, measuring instruments are used in determining or monitoring of process variables such as flow, fill level, pH and oxygen content. The measuring devices have a sensor unit, which generates a measured value or raw data for the measured value based on the measuring process and the relevant process variable, and an electronic unit, which, for example, controls the measurement, is used for power supply of the sensor unit, or processes the measured values for communication with a fieldbus. The electronic unit is typically housed in a housing to which the sensor unit is connected. Appropriately designed measuring devices are found in the prior art, for example, German patent DE 197 82 057 B4 corresponding to U.S. Pat. No. 5,954,526, European Patent EP 0 775 292 B1 and corresponding to U.S. Pat. No. 5,546,804, and in German Patent Application Publication DE 101 26 654 A1.

The measuring devices are usually installed directly on containers or tubes, and are therefore subject to heavy loads. Effects of temperature on the electronic components in the prior art, for example, are reduced in that corresponding long housing sections are used between the process and the electronics. Mechanical stresses due to vibrations that can occur, for example, by filling a container or as are generated by, e.g., mixers in the container, in particular, affect the contact points of the electrical components on the printed circuit boards. In the German translation of the European Patent DE 60 2006 000 146 T2, additional solder points are thus generated, for example, at non-conducting locations of the components. A multiple mechanical connection between the components and the circuit boards is thus created. The implementation of the additional solder points, that are not required electronically, goes hand in hand with an additional effort in design and manufacturing.

SUMMARY OF THE INVENTION

The object of the invention is thus to provide a measuring device, in which the effect of external mechanical stresses on electronic components can be reduced.

The indicated object is initially and essentially met by the measuring device being discussed here, in that the printed circuit board is arranged in the housing such that the printed circuit board plane is arranged at an angle to the orientation plane which differs from an integral multiple of 90°.

The housing, in which at least one electronic device is located, has at least one electronic access to the electronic device. A first longitudinal axis extends along the housing through the electronic access, which, for a cylindrical configuration of the relevant portion of the housing, is the longitudinal axis of the cylinder. If the electronic access generally opens to an access plane, i.e., the housing ends at the access plane, then the first longitudinal axis is, in particular, the perpendicular on this access plane, which extends centrally through the electronic access.

Furthermore, the housing has a sensor access for the connection to the sensor unit required for measurement. The sensor access opens, in particular, in a connection plane, which is usually a flange plane, since many measuring devices are attached to containers or tubes via a flange. A second longitudinal axis extends through the sensor access, which is in particular perpendicular on the connection plane. In a particular design of the sections of the housing, the first longitudinal axis and the second longitudinal axis are perpendicular to each other, so that the housing is at least partially L-shaped or T-shaped. The first and second longitudinal axes span an orientation plane.

At least one printed circuit board is in the measuring device, the board being preferably and typically equipped with electrical components, and provided in a printed circuit board plane. In the measuring device according to the invention, the printed circuit board is disposed in the housing such that the printed circuit board plane is arranged at an angle to the orientation plane, which differs from an integer multiple of 90°. However, if the electronic access is a circular opening and the connection plane is used as a guideline for an intended south pole, then the printed circuit board in this design is aligned neither in the north-south nor in the east-west direction. In one design, the printed circuit board plane runs along the bisectors of the quadrants, thus arranged in the north-east/south-west or in the north-west/south-east direction. In a further design the printed circuit board plane is also arranged at an angle to the connection plane, which differs from an integer multiple of 90°. The printed circuit board plane is therefore neither perpendicular to the connection plane nor parallel thereto. In a further design, the printed circuit board plane is preferably disposed at a 45° angle to the connection plane. Due to such "bias" arrangement of the printed circuit board relative to the plane of connection, the forces acting on the board and its components with the vibrations are reduced by vector division.

In one design, at least two electronic devices and at least one encapsulated contact element are provided, which is designed separately from the electronic devices and the housing and located between the two electronic devices. In the case of one electronic device, this can also be a purely passive electrical contact device, which is used, for example, in the connection of cables. The contact element further comprises at least one electronic or galvanic transmission element for forming an electrical connection between the two electronic devices. In this design, which can be implemented independently of the orientation of the board, however, a particularly advantageous measuring device is the result, if the measuring device has two separate electronic devices that preferably take over different tasks and are connected to one another within the housing by an encapsulated contact element. In the prior art, however, it is only known that electronic means are located in chambers of a housing separated by a wall, wherein they contact each other there by means of transmission elements, such as contact pins, which are arranged in an opening of the wall and are cast. Furthermore, electronic devices are also knonw, which are connected directly to each other in that an electronic device already has corresponding contact pins, wherein the entire housing is then cast. In this design, however, a separate and already-encapsulated contacting element is provided as an independent component. In one design, the transmission element is cast and/or set in glass in an outer wall of the contacting element, which consists, for example, at least partially of stainless steel or of a plastic. The transmission element is, for example, a metal pin.

In one design, the contact element and the two electronic devices are designed and attuned to one another in such a manner that the contact element and the two electronic devices are essentially connected with each other without a gap. The dimensions of the electronic devices and their housings and the contact element allow for a seamless connection between one another.

In an advantageous design, the housing has at least two chambers between which a passageway exists. One of the two electronic devices is located in each chamber and the encapsulated contact element is arranged in the passageway. In one design, the contact element is arranged with an exact fit in the passageway.

In detail there are a number of possibilities for designing and further developing the measuring device according to the invention as will be apparent from the following detailed description of embodiments of the invention in conjunction with the accompanying drawings.

DETAILED DESCRIPTION OF THE INVENTION

Figure 1:
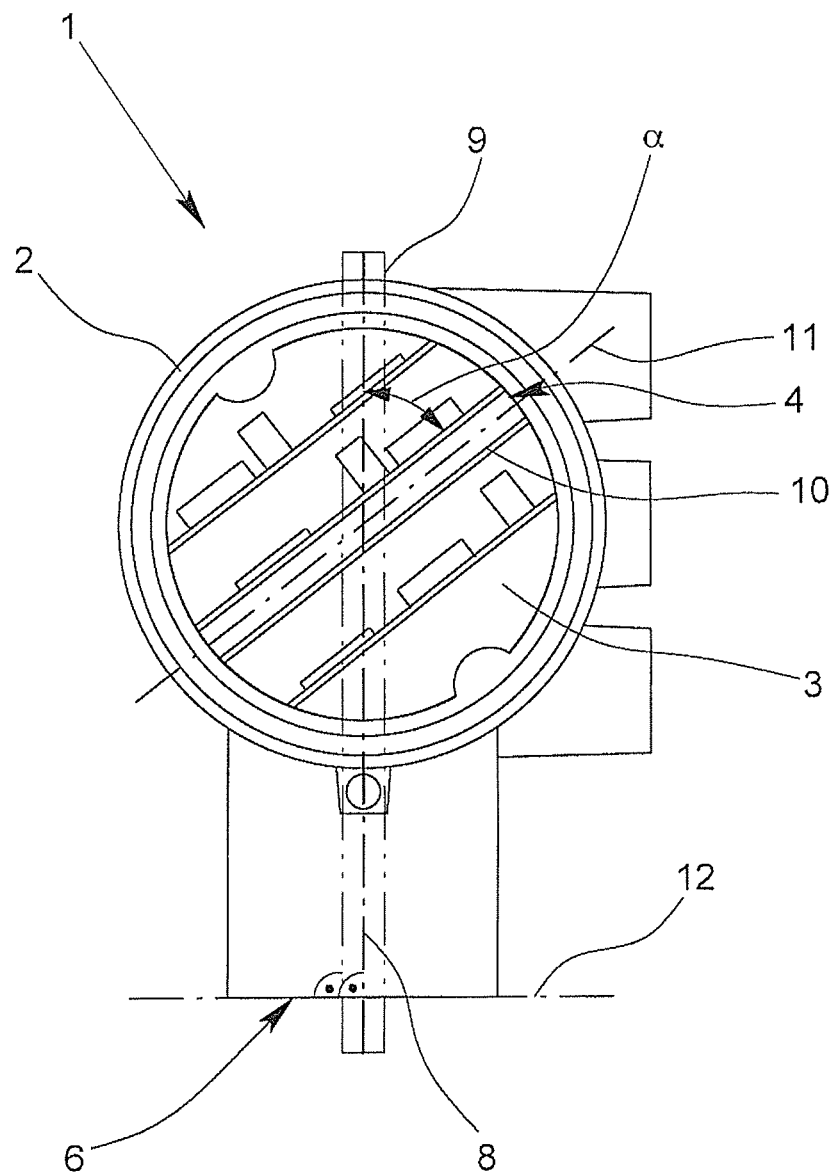
FIG. 1 is a schematic top plan view of a partially open housing of a measuring device according to the invention, showing essentially the fundamental arrangement.

FIG. 1 shows a measuring device 1 according to the invention with a partially open housing 2. An electronic device 3 can be seen through the electronic access opening 4. In the illustrated embodiment, the first longitudinal axis 5 (see, FIG. 2) of this section extends perpendicular into the drawing plane of FIG. 1. The lower neck of the housing 2 is used for the connection of a sensor unit 7 (see, FIG. 3) to the housing 2 via the sensor access opening 6. In the illustrated embodiment of the measuring device 1, the second longitudinal axis 8 runs through the sensor access opening 6 and perpendicular to the first longitudinal axis 5. The first longitudinal axis 5 and the second longitudinal axis 8 mutually span an orientation plane 9 (FIG. 2), which also extends into the drawing plane of FIG. 1.

The electronic device 3 has several printed circuit boards, of which one printed circuit board 10 is located in a printed circuit board plane 11. The other printed circuit boards in the illustrated embodiment are disposed parallel to the printed circuit board plane 11. The printed circuit board 10 is arranged inclined at a 45° angle, in the viewing direction of the electronic access 4. The printed circuit board plane 11 is, in particular, also at an angle α, which is 45°, in the illustrated embodiment, relative to the orientation plane 9. Due to this setting of the printed circuit board 10 relative to the orientation plane 9, there is also an orientation of 45° with respect to a connection plane 12, at which the sensor access opening 6 faces and which is, in most cases, the plane in which a flange is located for connection of the measuring device 1. Due to the inclination relative to the connection plane 12, the effects of vibrations on the printed circuit board 10, or respectively its components or the contact elements of the components can be reduced.

Figure 2:
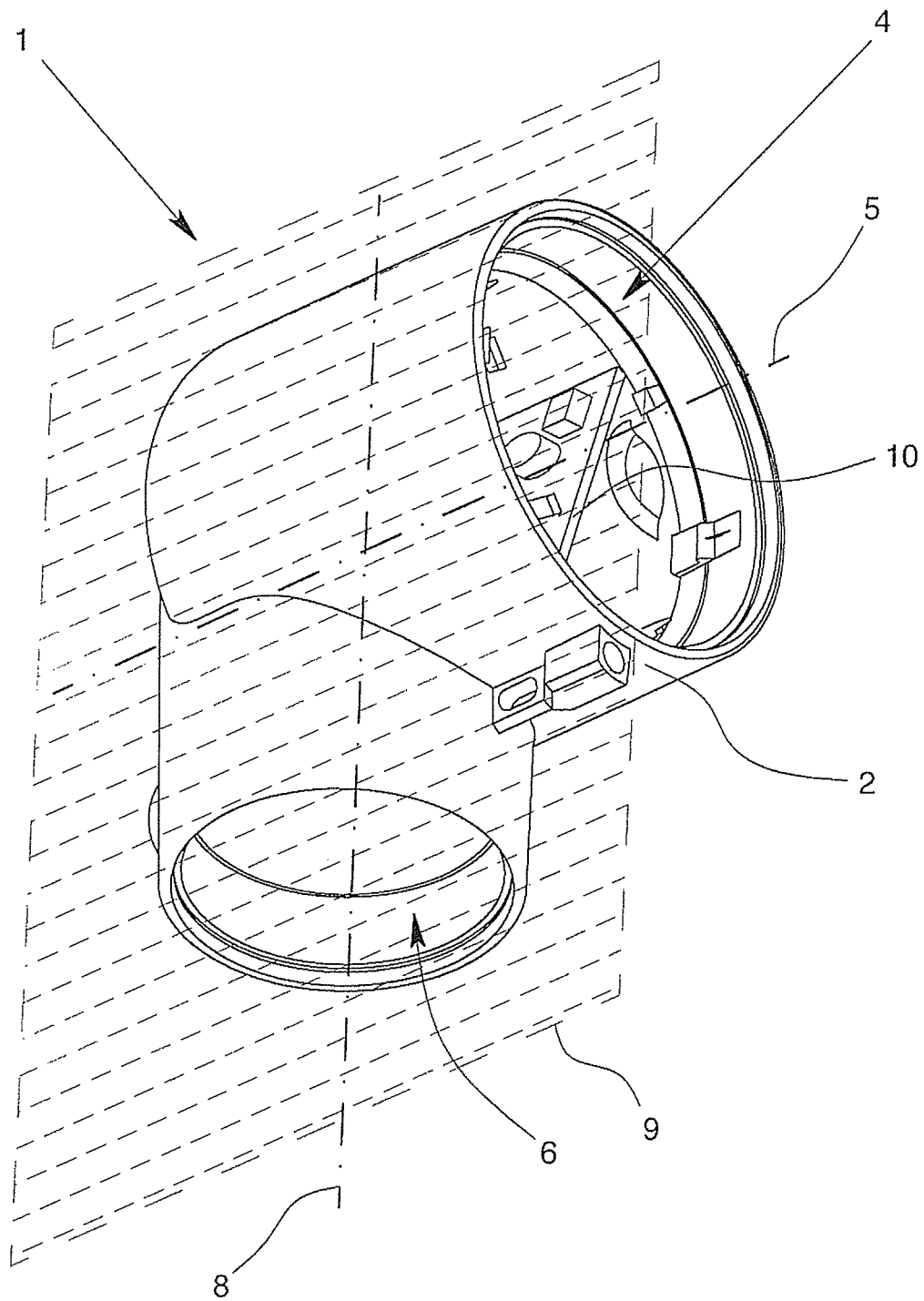
FIG. 2 is a perspective representation of a housing of the measuring device from FIG. 1.

FIG. 2 shows a housing 2, in which the first longitudinal axis 5 of the electronic access opening 4 and the second longitudinal axis 8 of the sensor access 6 form a right angle with each other and span the orientation plane 9. The printed circuit board 10 is inclined with respect thereto, so that, in the installed state, and in the application of the measuring device 1, forces and moments acting on the housing 2 via the lower neck are attenuated with respect to the printed circuit board 10 and its components.

Figure 3:
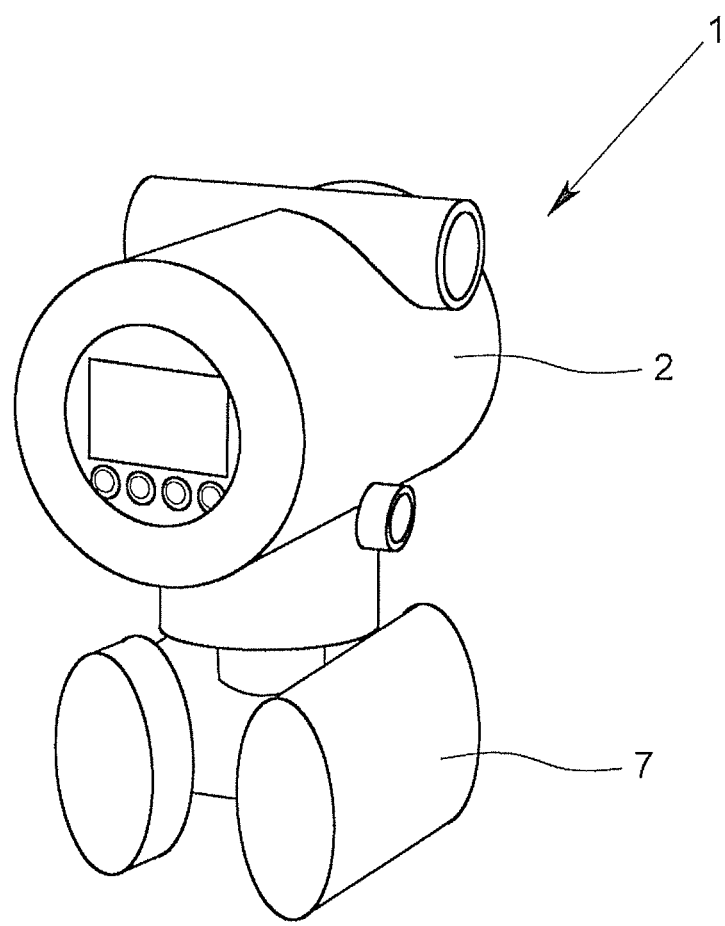
FIG. 3 is a perspective representation of a measuring device.

The measuring device 1 of FIG. 3 comprises the housing 2 and an example of a sensor unit 7. Both are joined to one another here via a screw connection.

Figure 4:
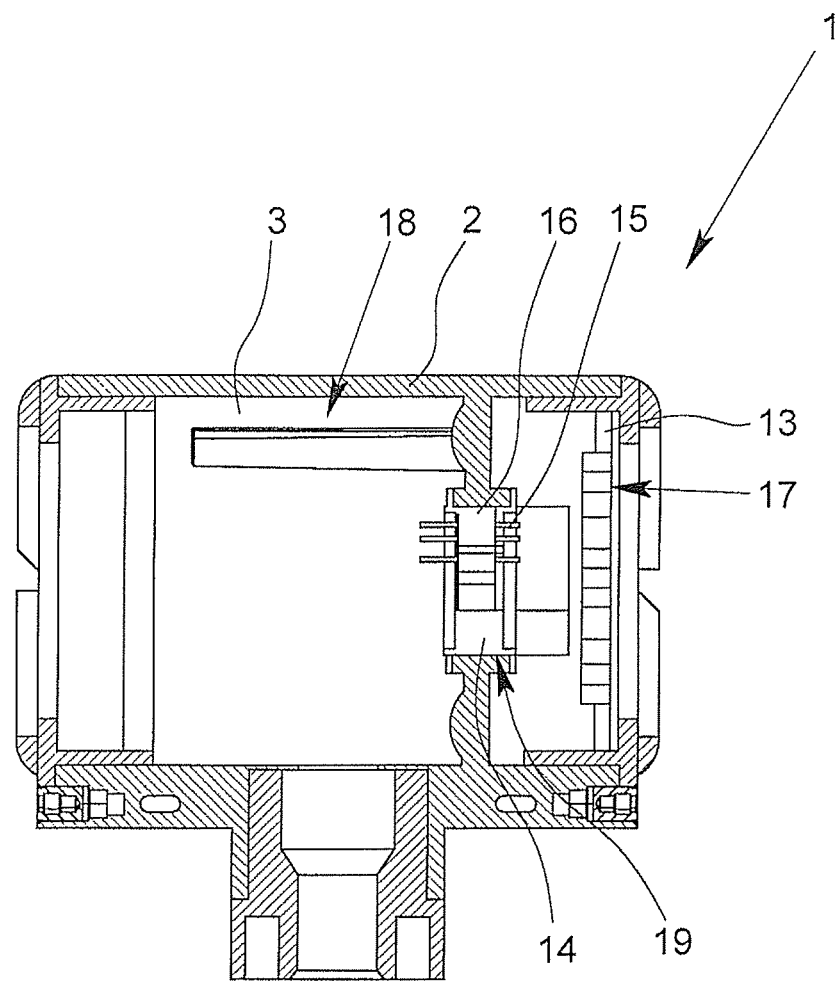
FIG. 4 is a partial sectional view of a housing of a measuring device according to the invention.

In the housing 2 of FIG. 4, there are two electronic devices 3, 13 between which an encapsulated and separate contact element 14 is arranged. An electrical connection is generated between the two electronic devices 3, 13 via transmission elements 15, which are contact pins in the illustrated embodiment and which are cast within an outer wall 16. The interior of the housing 2 is divided into two chambers 17, 18 with respect to the electronics unit, each chamber accommodating an electronic device 3, 13. There is a wall between the chambers 17, 18, which has a passageway 19 for accommodating the contact element 5 with an exact fit.

Figure 5:
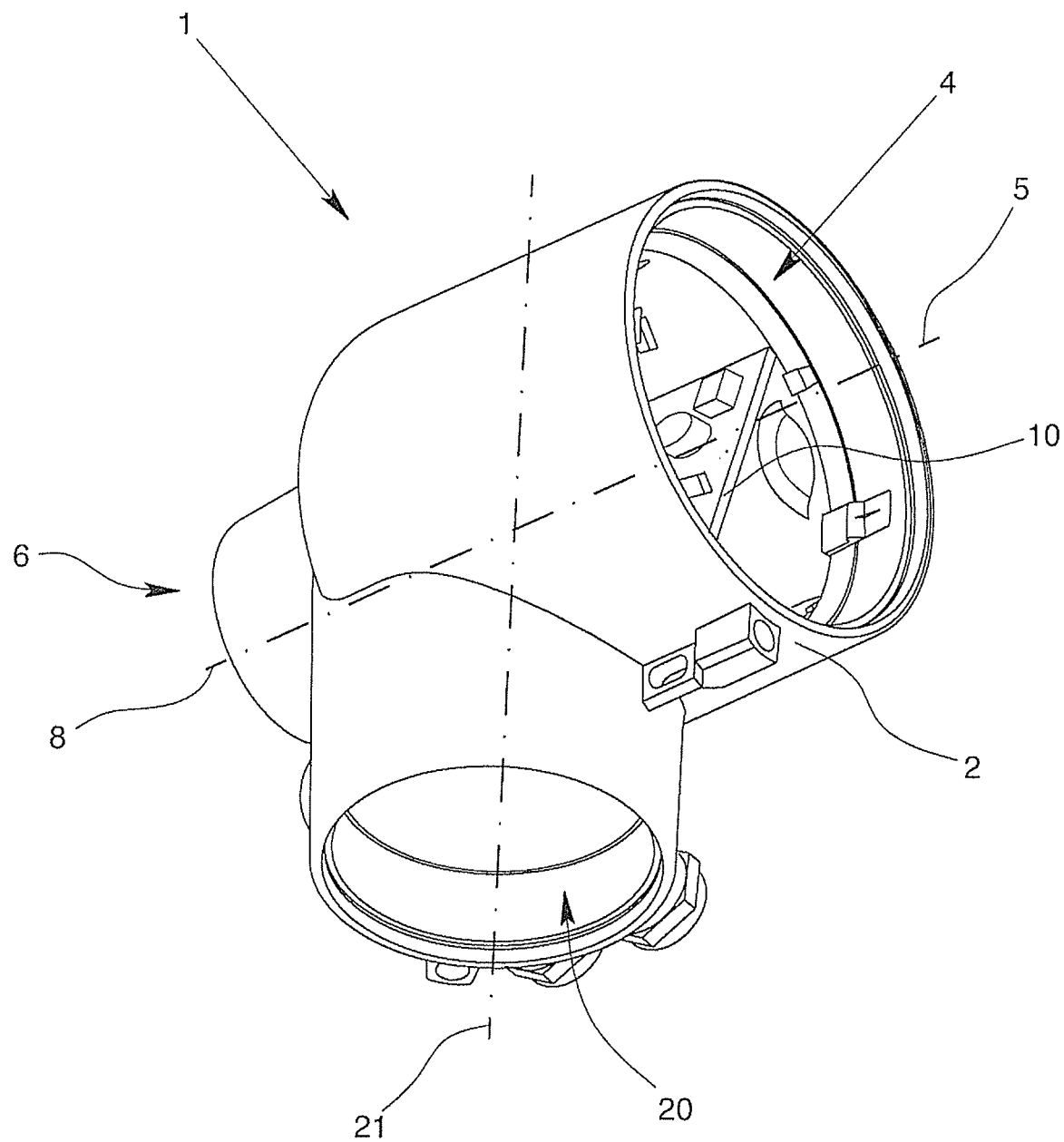
FIG. 5 is a perspective of a further variation of the housing of a measuring device according to the invention.

In the housing 2 of the measuring device 1 of FIG. 5, the first longitudinal axis 5 of the electronic access opening 4 and the second longitudinal axis 8 of the sensor access opening 6 coincide, since, in this variation, the accesses openings 4, 6 are arranged directly one behind the other. The housing 2 also has an electrical connection space 20 with a third longitudinal axis 21, which is disposed substantially perpendicular to the first and second longitudinal axes 5, 8. The third axis 21 and the first axis 5 or second longitudinal axis 2 span a plane, to which the printed circuit board plane of the circuit board 10 is inclined at an angle differing from an integer multiple of 90°. The variation in FIG. 5 is thus an independent alternative to the preceding embodiments.

What is claimed is:

1. Measuring device, comprising:
   at least one housing and
   at least one electronic unit,
   wherein the housing has at least one electronic access opening for providing access to the electronic unit,
   wherein a first longitudinal axis extends through the electronic access opening,
   wherein the housing has a sensor access opening for connecting of a sensor unit to the housing,
   wherein a second longitudinal axis extends through the sensor access opening,
   wherein the first longitudinal axis and the second longitudinal axis span an orientation plane,
   wherein the electronic unit has at least one printed circuit board,
   wherein the at least one printed circuit board lies essentially in a printed circuit board plane that is arranged at an angle relative to the orientation plane that differs from an integral multiple of 90°, and
   wherein the sensor access opening leads into a connection plane and wherein the printed circuit board is arranged in the housing in such a manner that the printed circuit board is arranged at an angle relative to the connection plane that differs from an integral multiple of 90°.

2. Measuring device according to claim 1, wherein said at least one electronic unit comprises at least two electronic units, wherein at least one encapsulated contact element is provided, wherein the contact element is separate from the electronic units and the housing, wherein the contact element is arranged between the electronic units and wherein the contact element has at least one electronic transmission element for establishing an electric connection between the electronic units.

3. Measuring device comprising:
at least one housing and
at least one electronic unit,
wherein the housing has at least one electronic access opening for providing access to the electronic unit,
wherein a first longitudinal axis extends through the electronic access opening,
wherein s a sensor access opening for connecting of a sensor unit to the housing,
wherein a second longitudinal axis extends through the sensor access opening,
wherein the first longitudinal axis and the second longitudinal axis span an orientation plane,
wherein the electronic unit has at least one printed circuit board,
wherein the at least one printed circuit board lies essentially in a printed circuit board plane that is arranged at an angle relative to the orientation plane that differs from an integral multiple of 90°,
wherein said at least one electronic unit comprises at least two electronic units, wherein at least one encapsulated contact element is provided, wherein the contact element is separate from the electronic units and the housing, wherein the contact element is arranged between the electronic units, wherein the contact element has at least one electronic transmission element for establishing an electric connection between the electronic unit, and
wherein the transmission element is at least one of cast and set in glass within an outer wall of the contact element.

4. Measuring device comprising:
at least one housing and
at least one electronic unit,
wherein the housing has at least one electronic access opening for providing access to the electronic unit,
wherein a first longitudinal axis extends through the electronic access opening,
wherein the housing has a sensor access opening for connecting of a sensor unit to the housing,
wherein a second longitudinal axis extends through the sensor access opening,
wherein the first longitudinal axis and the second longitudinal axis span an orientation plane,
wherein the electronic unit has at least one printed circuit board,
wherein the at least one printed circuit board lies essentially in a printed circuit board plane that is arranged at an angle relative to the orientation plane that differs from an integral multiple of 90°,
wherein said at least one electronic unit comprises at least two electronic units, wherein at least one encapsulated contact element is provided, wherein the contact element is separate from the electronic units and the housing, wherein the contact element is arranged between the electronic units, wherein the contact element has at least one electronic transmission element for establishing an electric connection between the electronic unit, and
wherein the contact element and the electronic units are arranged relative to one another in such a manner that the contact element and the electronic units are joined together in an essentially gap-free manner.

5. Measuring device comprising:
at least one housing and
at least one electronic unit,
wherein the housing has at least one electronic access opening for providing access to the electronic unit,
wherein a first longitudinal axis extends through the electronic access opening,
wherein the housing has a sensor access opening for connecting of a sensor unit to the housing,
wherein a second longitudinal axis extends through the sensor access opening,
wherein the first longitudinal axis and the second longitudinal axis span an orientation plane,
wherein the electronic unit has at least one printed circuit board,
wherein the at least one printed circuit board lies essentially in a printed circuit board plane that is arranged at an angle relative to the orientation plane that differs from an integral multiple of 90°,
wherein said at least one electronic unit comprises at least two electronic units, wherein at least one encapsulated contact element is provided, wherein the contact element is separate from the electronic units and the housing, wherein the contact element is arranged between the electronic units, wherein the contact element has at least one electronic transmission element for establishing an electric connection between the electronic unit, and
wherein the housing has at least two chambers between which a passage exists, wherein one of the electronic units is arranged in each of the chambers and wherein the contact element is arranged in the passage.

* * * * *